(12) United States Patent
Efrati et al.

(10) Patent No.: US 9,100,475 B2
(45) Date of Patent: Aug. 4, 2015

(54) ROUTING COMMUNICATIONS BASED ON HISTORY OF PREVIOUS COMMUNICATIONS

(71) Applicant: VONAGE NETWORK LLC, Holmdel, NJ (US)

(72) Inventors: Tzahi Efrati, Hoboken, NJ (US); Baruch Sterman, Efrat (IL)

(73) Assignee: VONAGE NETWORK LLC, Holmdel, NJ (US)

( * ) Notice: Subject to any disclaimer, the term of this patent is extended or adjusted under 35 U.S.C. 154(b) by 139 days.

(21) Appl. No.: 13/896,760

(22) Filed: May 17, 2013

(65) Prior Publication Data

US 2014/0341081 A1 Nov. 20, 2014

(51) Int. Cl.
*H04L 12/16* (2006.01)
*H04M 3/436* (2006.01)

(52) U.S. Cl.
CPC ........ *H04M 3/436* (2013.01); *H04M 2203/551* (2013.01)

(58) Field of Classification Search
CPC .................................................... H04M 7/0075
USPC ............ 370/216–438; 709/204–225; 379/201
See application file for complete search history.

(56) References Cited

U.S. PATENT DOCUMENTS

| | | |
|---|---|---|
| 6,301,350 B1 | 10/2001 | Henningson et al. |
| 7,653,188 B2 | 1/2010 | Kloberdans et al. |
| 7,978,831 B2 | 7/2011 | Baird et al. |
| 8,243,718 B2 | 8/2012 | l'Anson |
| 2002/0078158 A1* | 6/2002 | Brown et al. ................. 709/206 |
| 2005/0259667 A1 | 11/2005 | Vinokurov et al. |
| 2008/0025488 A1* | 1/2008 | Dean et al. ............... 379/201.11 |
| 2008/0031436 A1 | 2/2008 | Der et al. |
| 2009/0067410 A1 | 3/2009 | Sterman et al. |
| 2011/0029626 A1* | 2/2011 | Goodrow et al. ............. 709/206 |
| 2011/0289217 A1 | 11/2011 | Prasad et al. |

* cited by examiner

*Primary Examiner* — Iqbal Zaidi
(74) *Attorney, Agent, or Firm* — Moser Taboada; Joseph Pagnotta

(57) ABSTRACT

A method and system for routing communications includes building a first user profile for a first user based on a history of communications associated with a first communication identifier to route inbound communications. The first communication identifier is associated with the first user and subsequently, the first communication identifier may be assigned to a second user. A second communication identifier is assigned to the first user such that a received inbound communication is directed towards the first communication identifier. The method routes the inbound communication based on an analysis of the first user profile of the first user.

16 Claims, 7 Drawing Sheets

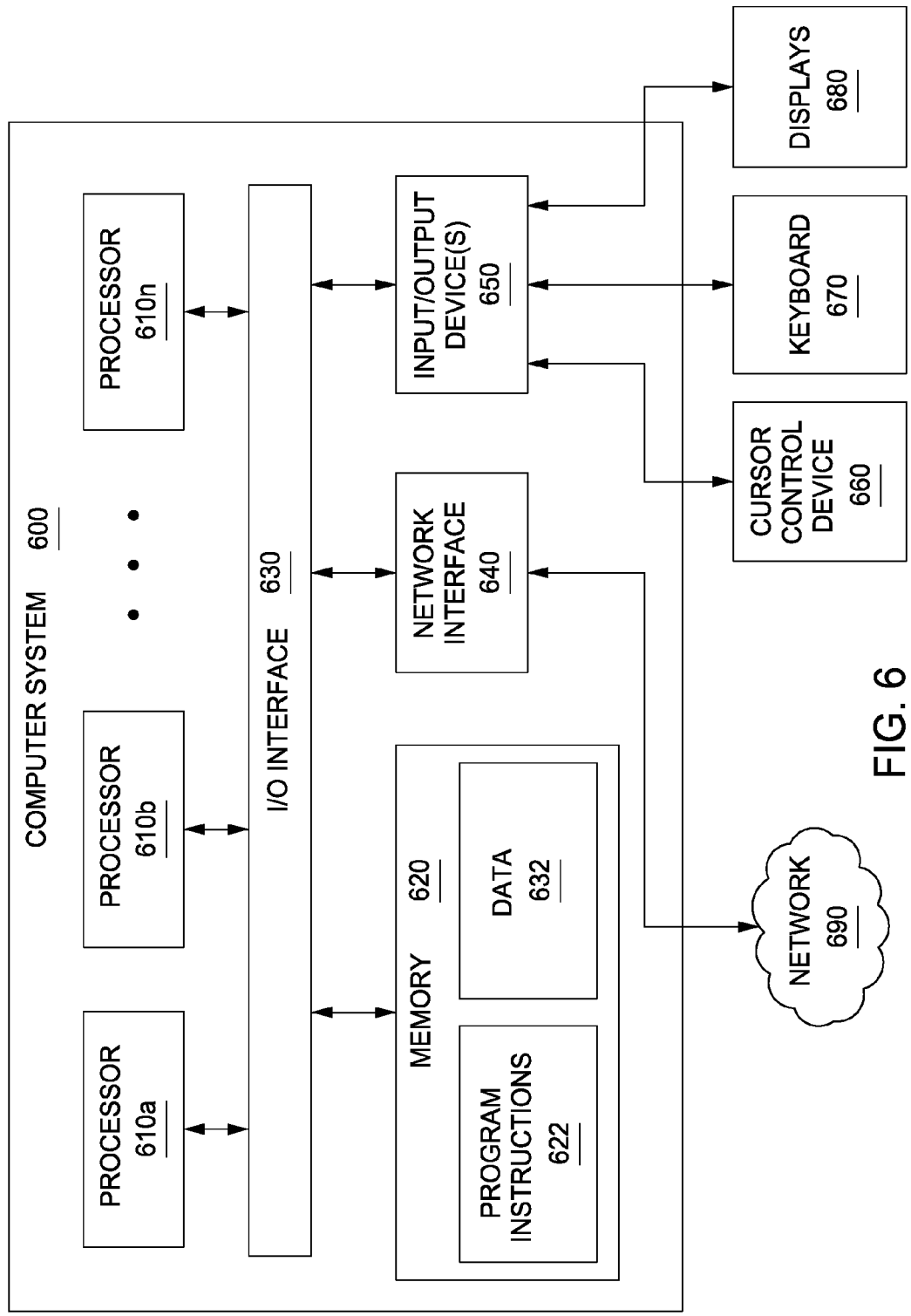

ROUTING COMMUNICATIONS BASED ON HISTORY OF PREVIOUS COMMUNICATIONS

BACKGROUND OF THE INVENTION

1. Field of the Invention

Embodiments of the present invention generally relate to the field of electronic communications systems. More specifically, embodiments of the present invention relate to management/routing of incoming communications based on a history of previous communications.

2. Description of the Related Art

As the number of users of communication equipment continues to grow, the availability of communication identifiers, such as telephone numbers for example, decreases and identifiers are often reused by different people. However, as users transition to new communication identifiers from old communication identifiers, not all of their contacts or potential contacts are updated with the new identifier. In a highly connected society, missing a contact is a source of frustration for users and compounds network congestion.

In other instances, users may receive calls from unwanted callers such as telemarketers. Incoming calls thus become less welcomed and may also frustrate users who find themselves on an unsolicited call list.

Thus, there is a need to reduce the probability of misdials and decrease network congestion.

SUMMARY OF THE INVENTION

Some embodiments, of the present invention generally relate to electronic communications systems and more specifically, customer profiling and call routing based on communications history.

In some embodiments, a method for routing communications includes building a first user profile for a first user based on a history of communications associated with a first communication identifier to route inbound communications. The first communication identifier is associated with the first user and subsequently, the first communication identifier may be assigned to a second user. A second communication identifier is assigned to the first user such that a received inbound communication is directed towards the first communication identifier. The method routes the inbound communication based on an analysis of the first user profile of the first user.

In some embodiments, a method for routing calls includes receiving a first inbound communication directed towards a first communication identifier assigned to a first user having a first user profile. Further, routing the first inbound communication towards a device associated with the first user based on an analysis of the first user profile. The method identifies the first communication identifier has been assigned to a second user having a second user profile. The method receiving a second inbound communication directed towards the first communication identifier. The method routes the second inbound communication to the first user based on an analysis of the first user profile.

In some embodiments, a system for routing communications comprises at least one processor, at least one input device, and at least one storage device storing processor-executable instructions. The instructions which, when executed by the at least one processor, performs a method. The method including building a first user profile for a first user based on a history of communications associated with a first communication identifier, wherein the first communication identifier is associated with the first user. The method further including receiving an inbound communication directed towards the first communication identifier after the first communication identifier has been assigned to a second user and a second communication identifier has been assigned to the first user. The method then routing the inbound communication based on an analysis of the first user profile of the first user.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 depicts a computer system that can be utilized in various embodiments of the present invention, according to one or more embodiments.

Figure 1A:
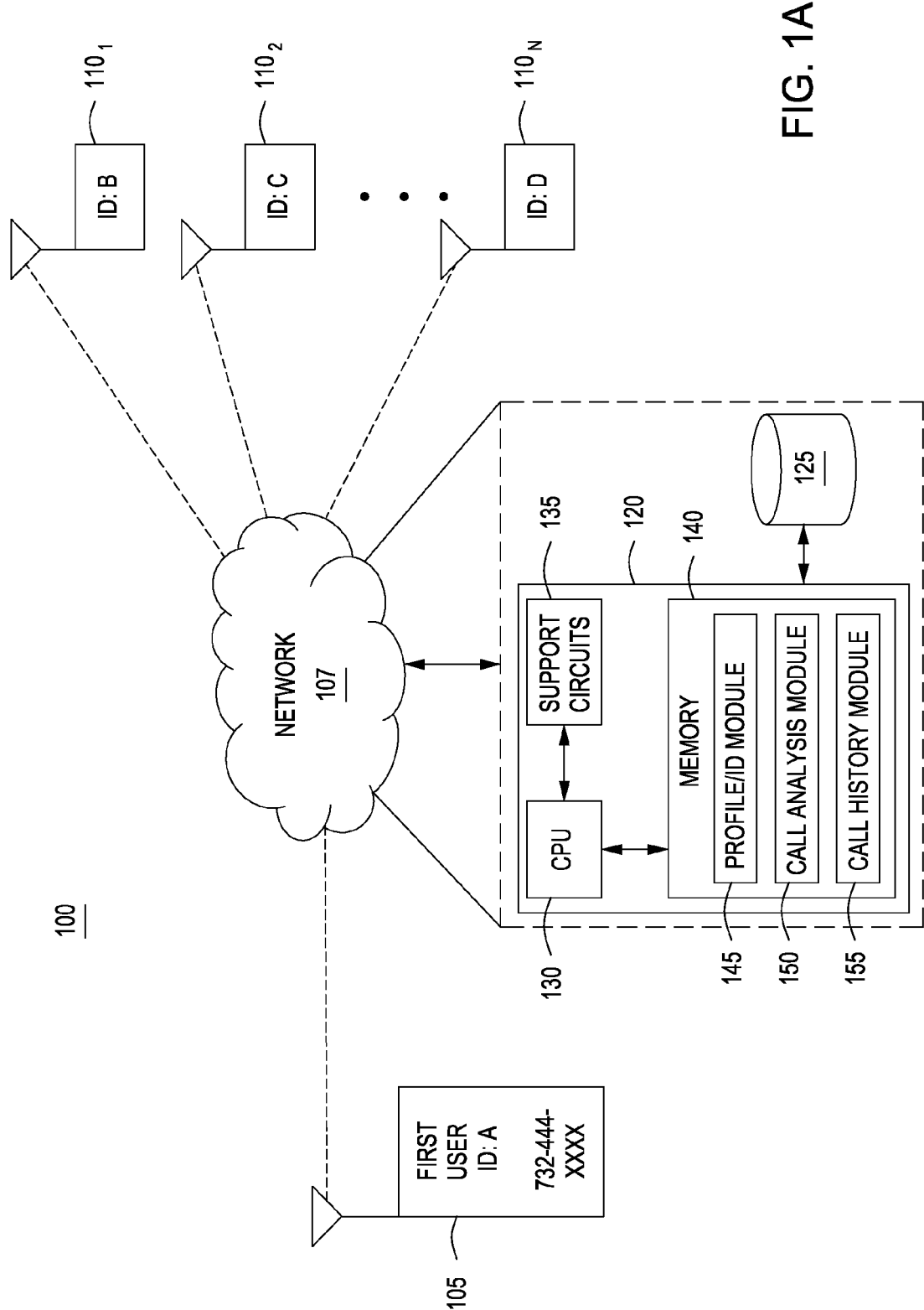
FIG. 1A is a simplified illustration of a communications monitoring system in accordance to one or more embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention build user profiles based on collected data associated with inbound and outbound communications made to/from an electronic device having a communication identifier such as a telephone number. In some embodiments, the communications may include voice calls, video calls, SMS messages, and the like. The communication identifier may be associated with a first user of a Voice over Internet Protocol (VoIP) or Public Switched Telephone Network (PSTN) telecommunications service. Embodiments of the present invention may differentiate call patterns of a first user from a second user to which the communication identifier may have been transferred to. For example, should the telephone number originally assigned to a device of the first user be subsequently transferred to a device of a second user, the system may then determine whether an inbound call is intended for the first user or the second user based on the user profile built. In some embodiments, users may voluntarily provide information to the system such as frequent contacts or non-local areas of interests (e.g. where a significant number of friends and family are located). Additional information for profiles improves the ability to reduce unintended wrong numbers by correctly redirecting calls to a specific user profile regardless of changing numbers or phones. Conversely, the user may also supply information of types of businesses or numbers from which the user would not want to receive calls.

FIG. 1A is a simplified diagram of a communications monitoring system 100 in accordance to one or more embodiments of the present invention. The monitoring system 100 comprises a first electronic device (e.g. mobile phone) 105 assigned a first telephone number, a network 107, and additional electronic devices ($110_1$, $110_2$, . . . $110_N$). The first electronic device 105 has a unique user identification ID, "A" along with the assigned first number. The ID allows a communications service 115 (e.g. cellular, Wi-Fi, e-mail, TWITTER, FACEBOOK, FOURSQUARE, social media identifier and the like) to identify the first electronic device 105 as holding communications belonging to or associated with a first user. Similarly, additional electronic devices have unique IDs "B", "C", . . . "N" for corresponding users ($110_1$, $110_2$, . . . $110_N$). In some embodiments, the unique user identification ID is static and permanently associated with a user of the service.

The communications service 115 comprises at least one server 120 connected to or operating within the network 107. The server 120 comprises a CPU 130, support circuits 135, and memory 140. The memory 140 may comprise a profile and ID module 145, call analysis module 150, call history module 155. The profile and ID module 145 contains instructions and data necessary for the CPU 130 to correlate user data to build and maintain user profiles. User data may be stored in a user database 125. The call analysis module 150 contains instructions to analyze incoming calls based on the user profile and call history from the call history module 155. The call history module 155 contains data regarding the past calls made or received by a user and assists the profile module 120 to build the user profile(s).

The server 120 thus monitors, via the network 107, the call histories of users on the network 107. As will be discussed further with respect to FIG. 1B, the server 120 or service provider 115 uses collected data to predictively reroute future calls to users. Alternative embodiments may include land line telephones or a combination of land line telephones with mobile phones.

Monitored data may include duration, call timing, call location, call direction (incoming/outbound), call termination status (answer, rejected, ignored, cancelled), callee response (whether a callee called caller back), caller frequency, types of businesses or entities, geographic origins, user contacts and the like. The accumulation of such data includes filtering using algorithms. The algorithms may be as basic as matching a current incoming call number with that of a previously dialed or received number on the first electronic device 105. In such an algorithm, the server 120 has authenticated an incoming call as originating from a number that has been dialed or received by the user identified by the unique user ID. In some embodiments, the user ID may comprise an alphanumeric code that is encrypted and allows the network 107 and server 120 to identify a user when the user changes phone numbers. In some embodiments, the user ID may be used to track inbound and outbound communications. In some embodiments, the user ID may be an electronic serial number (ESN), mobile identification number (MIN), or system identification code (SID).

Figure 1B:
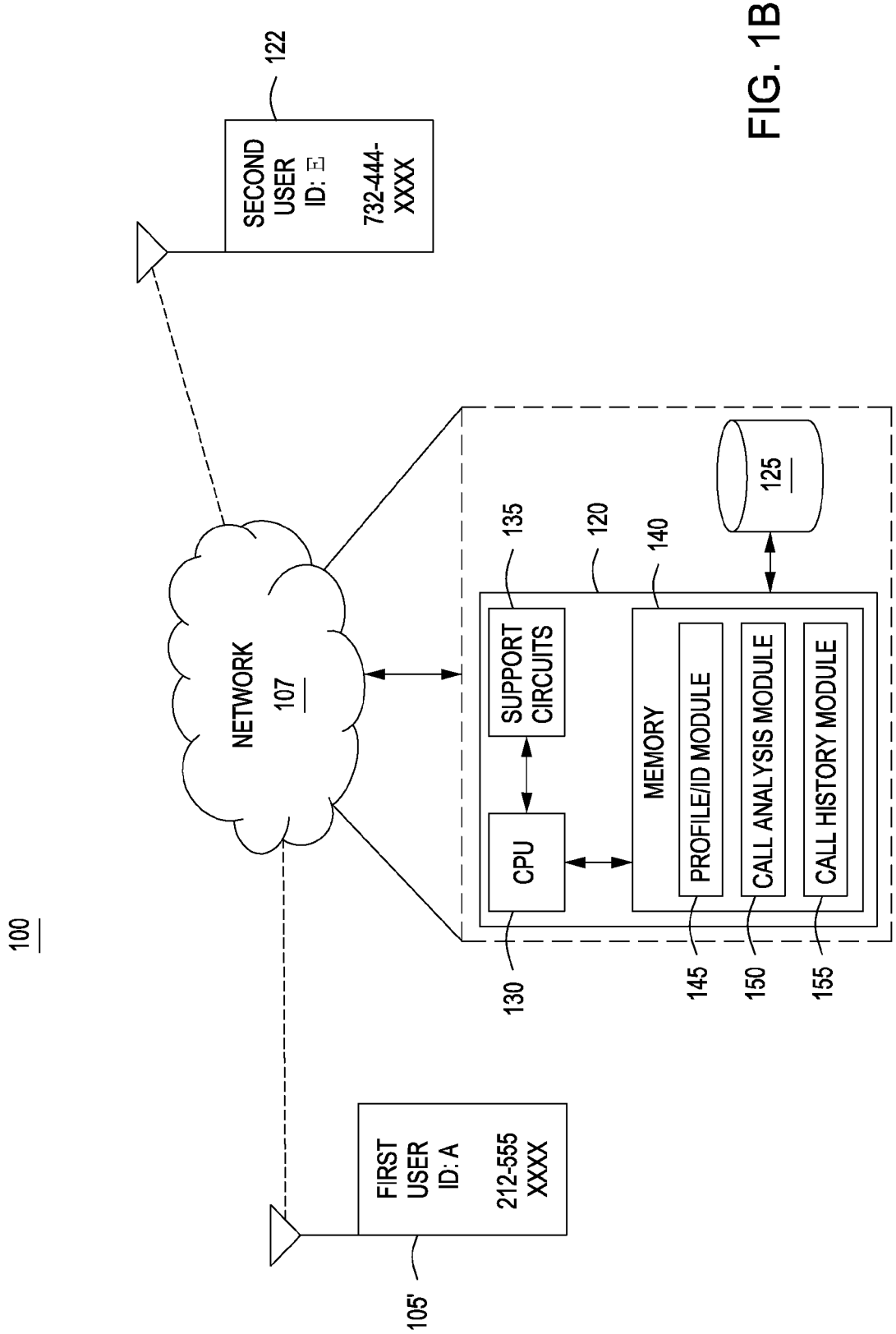
FIG. 1B is a simplified illustration of the system in FIG. 1A wherein a second electronic device has a phone number previously assigned to a first electronic device in accordance to one or more embodiments of the present invention.

FIG. 1B is a simplified illustration of the system in FIG. 1A wherein a second electronic device 122 has a phone number previously assigned to the first electronic device 105' in accordance to one or more embodiments of the present invention. FIG. 1B depicts an exemplary embodiment, wherein the first electronic device 105' is identified as belonging to the first user via the user ID "A". The first electronic device is assigned a different phone number while the second electronic device 122 is assigned the phone number previously assigned to the first electronic device 105'. The second user is associated with the user ID "E" on the network 107. Such a situation may arise when the first user selects a new phone number and the previous number of the first user is ported to the second user and second electronic device 122. In some embodiments, the assignment of IDs and phone numbers may be accomplished or facilitated by the PSTN or mobile telephone switch office (MTSO) via a service provider 115.

Predictive routing of calls uses profiles from the profile module 145 to direct the call towards the user profile (and user) most likely intended by the caller. The profiles are created using algorithms processing past monitored call data to insure calls reach the intended recipient. In some embodiments, monitored data may include other sources of such as call histories from other PSTN terminators, MTSO signals, or over-the-top (OTT) applications (e.g., software applications for mobile, tablet or other similar portable electronic devices that are capable of providing communication services from a provider other than that typically associated with the portable electronic device). For example, a carrier may track particular cell tower usage (e.g. of an inbound or outbound call) through the MTSO or an OTT application may provide a common contacts list.

More complex algorithms may include parsing the data into a series of bins with various weights used in identifying key thresholds to develop a profile rank or probability. Ranking incoming and outgoing calls allows for predictive call routing to determine the probability that a caller is trying to reach a first user with a new number and not the second user with the previous number of the first user. For example, the first user may receive a call from a particular vendor every Wednesday within a particular time window for a weekly product quote. The probability the second user ID and second electronic device 122 should correctly receive such a call is very low and such a call has a high rank for the first user ID with corresponding low rank for the second user ID. In some embodiments, call repetition is modeled into one of the most important (e.g. highest weighted) bins. In this example, the high rank indicates the high probability the intended recipient is the first user. Thus, the network 110 would redirect the call to the first user ID with the present first mobile phone 105' assigned the second number. Alternative embodiments may include monitoring the second electronic device 125 to develop a profile for the second user associated with the second electronic device 125.

Figure 2:
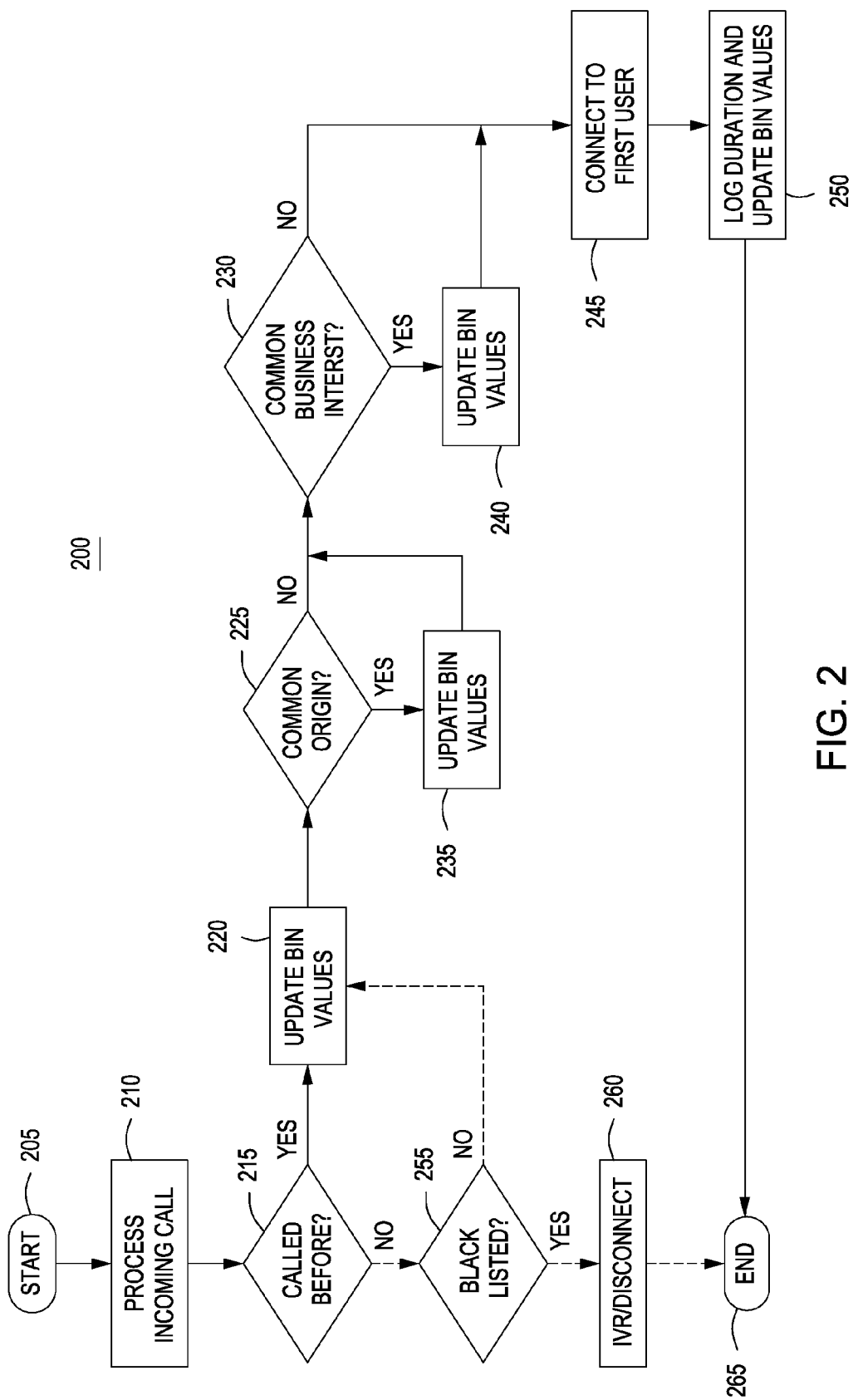
FIG. 2 is an exemplary flow diagram for a method of profiling a past call in accordance to one or more embodiments of the present invention.

FIG. 2 is an exemplary flow diagram for a method 200 of profiling a past call in accordance to one or more embodiments of the present invention. The method 200 is executed by the server 120 and/or service provider 115 on the network 110 and begins at step 205. The server 120 receives an indicator from the service provider 115 the phone number previously assigned to the first electronic device 105 has been assigned to a second electronic device 120. The indicator identifies that the number has been reassigned to another device and/or user. For example, the indicator may originate from when a user reactivates a number on a VoIP or cellular service carrier from a known used number block. Upon reactivation, the service provider 115 may send an indicator to signal the server 120 the reactivated number is in use by a different user.

Continuing to step 210, the server 120 processes an incoming call to the first electronic device 105. The server 120 builds a profile rank for the incoming caller using a series of bins from the highest weight relevance to lowest relevance. Continuing on to step 215, the server 120 determines whether the caller has called before and optionally compares the call number with that of a black list at step 255. If the server 120 determines the caller is black listed, the caller is connected to an interactive voice response or simply disconnected at step 260 and the method 200 ends at step 265. However, if the caller is not black listed, the method 200 proceeds to step 220 to update the bin for logging call frequency.

Referring back to step 215, should the server 120 determine the caller has not called before or has been dialed by the first electronic device 105 the network 110 updates the bin for the call frequency of the caller. The method 200 then continues to step 225 to determine whether the caller is from a common origin (i.e. same locality of the first user) and updates the appropriate bin at step 235 or otherwise proceeds to step 230. At step 230 the server 120 determines whether the caller is from a common business interest as the first electronic device 105 and updates the corresponding bin at step 240. Otherwise, the method 200 continues to step 245 and connects the caller to the first electronic device 105. Next, at step 250, the server 120 logs the duration of the call and updates the corresponding bin in memory 140. In some embodiments, the call duration bin may be of the same weight or greater than the call frequency bin. The method 200 then ends at step 265. As bin values are not decreased using the method 200, the most popular callers (unless black listed) are over time assessed the highest rank.

Figure 3:
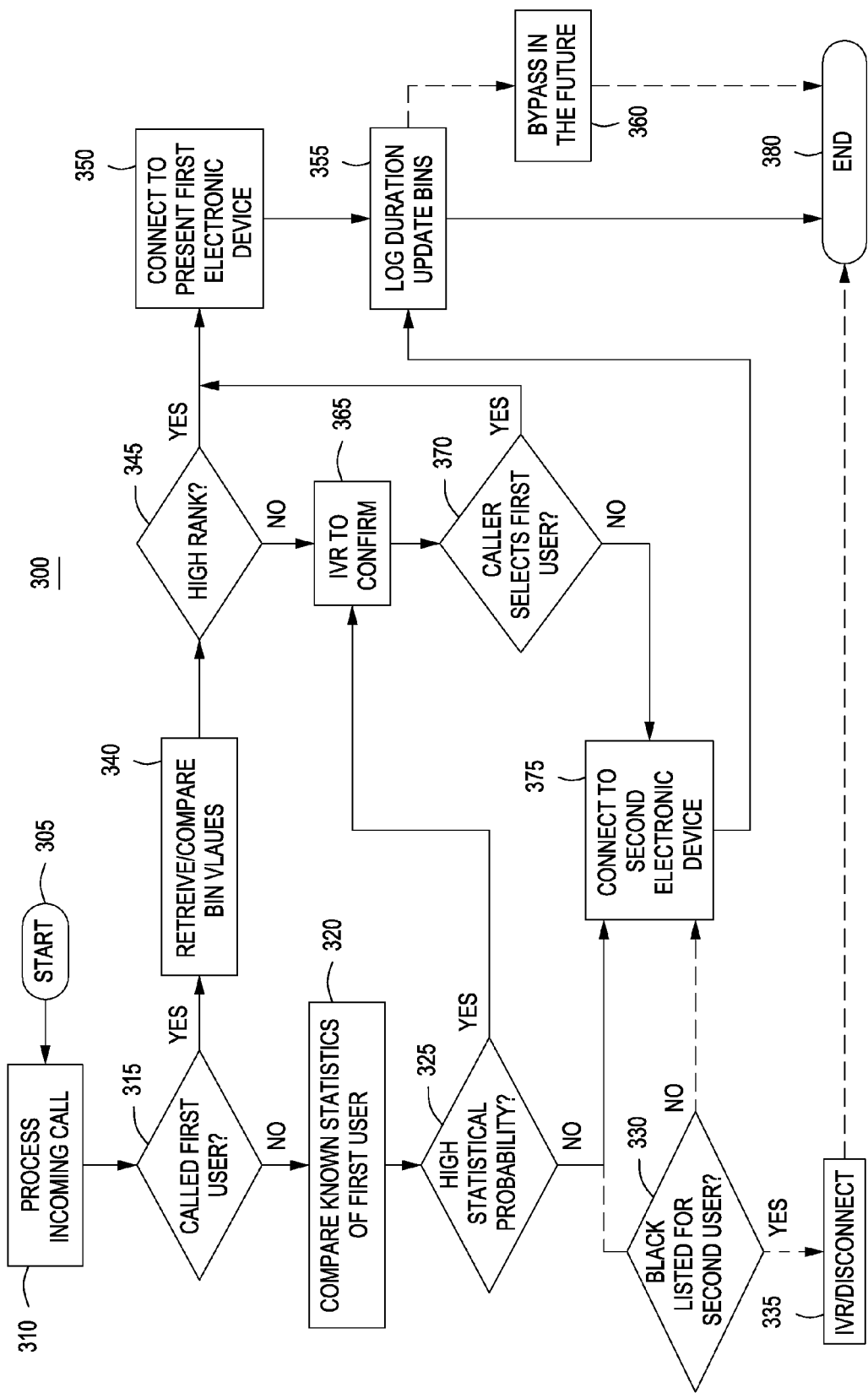
FIG. 3 is an exemplary flow diagram for a method of redirecting a present call in accordance to one or more embodiments of the present invention.

FIG. 3 is an exemplary flow diagram for a method 300 of redirecting a present call in accordance to one or more embodiments of the present invention. In some embodiments, the method 300 may be implemented by the server 120. The method 300 begins at step 305, and continues to step 310. At step 310, an incoming call is processed by the server 120 on the network 110. The incoming call at step 310 is to the phone number previously assigned to the first electronic device 105 of the first user. The phone number is presently assigned to the second electronic device 120 of the second user. The method 300 continues to step 315 wherein the server 120 determines whether the caller has in past history, called the first user on the first electronic device 105. If the server 120 determines the caller has not called the first electronic device 105, the method continues to step 320 and compares known statistics of the first user. Such statistics may include frequent call origins, business interests, past contacts, and other categories known of the profile for the first user. If the server 120 determines a high statistical probability the call is intended for the first user per decision step 325, the method 300 continues to step 365 and directs the caller to an interactive voice response (IVR). In some embodiments, the IVR may also be an automated attendant or voice response unit (VRU).

However, if there is a low statistical probability, the method 300 optionally continues to step 330 to determine whether the caller is on a black list for the second electronic device 125 of the second user. If the server 120 optionally determines the caller is black listed, the caller is disconnected or directed to an IVR at step 335 and the method 300 ends at step 380. However, if the server 120 determines the caller is not black listed, the caller is connected to the second user at step 375 and the bins of the profile for the second user are updated at step 355. The server 120 may then optionally update a bypass notification to bypass future comparisons with the first electronic device 105 of the first user for the caller at step 360. The method 300 then ends at step 380.

Referring back to step 315, wherein if the server 120 determines the caller has called the first electronic device 105 before, the method continues to step 340. At step 340, the server 120 retrieves bin values for the caller and proceeds to step 345 to determine if the caller reaches a predetermined high rank threshold. If the server 120 determines the threshold is reached, the caller is connected to the present electronic device 105' of the first user. However, if the server 120 determines the threshold is not reached, the server 120 continues to step 365 to confirm with the caller using an IVR which user the caller seeks to reach. Next at step 370, the server 120 determines the caller does not select the first user and the caller is connected to the second user at step 375.

Should the server 120 determine the caller selected the first user, the method 300 continues to step 350 and connects the caller to the present first electronic device 115 of the first user with the second number. The method 300 then continues on to step 355 wherein the duration of the call and other statistics are logged and the bin values are updated. Optionally, the server 120 may implement a bypass routine such that future calls from this number are automatically redirected to the present first electronic device 115. In alternative embodiments, the caller may be given the new number of the first user via voicemail, text message, e-mail, voice recording, and the like. The method 300 then ends at step 380. In alternative embodiments, phone numbers may be other forms of identification means that may be reassigned (e.g. IP addresses).

Figure 4:
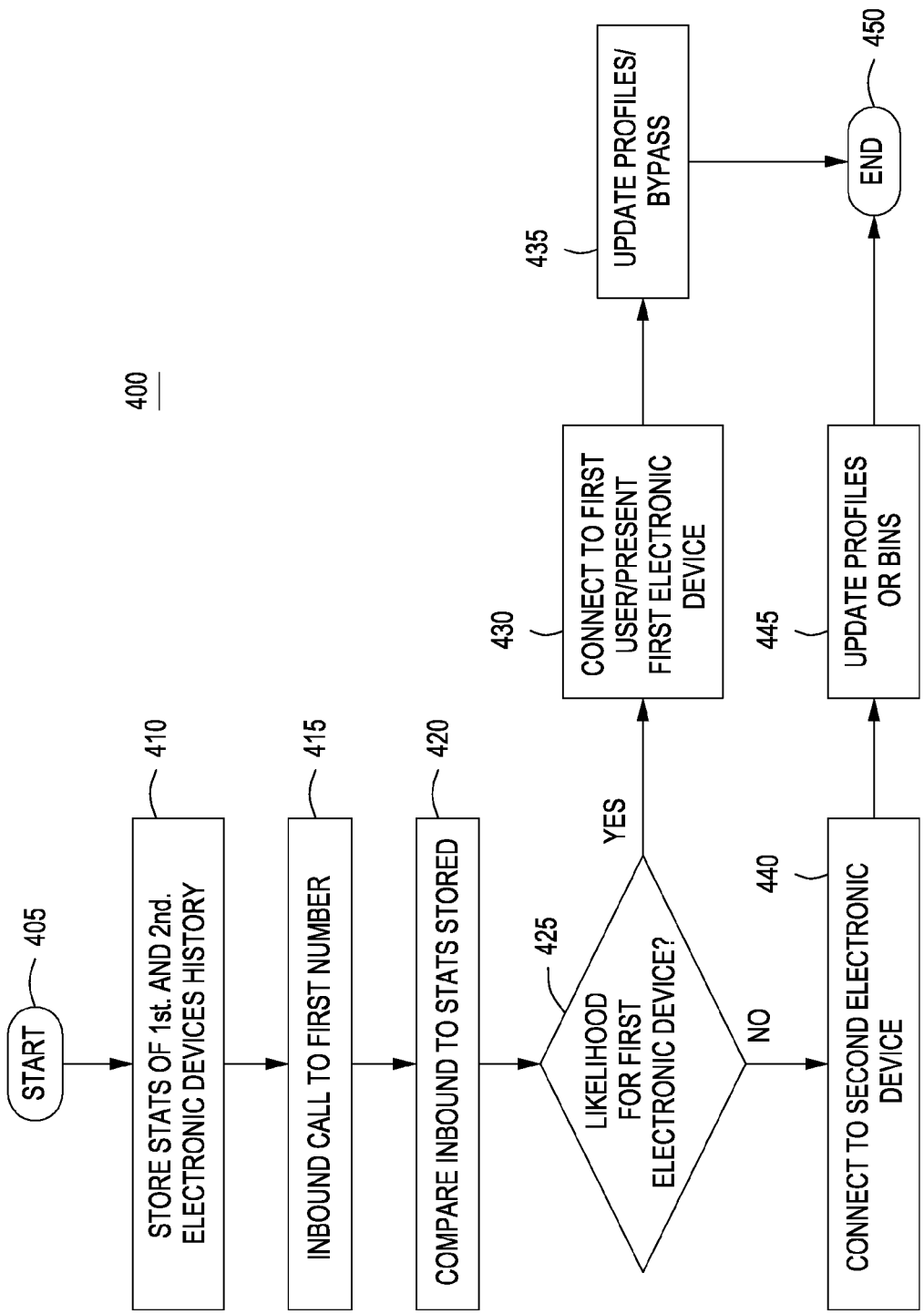
FIG. 4 is an exemplary flow diagram for a method of redirecting a present call using two known profiles in accordance to one or more embodiments of the present invention.

FIG. 4 is an exemplary flow diagram for a method 400 of redirecting a present call using two known profiles in accordance to one or more embodiments of the present invention. The exemplary method 400 may be implemented by the server 120 and uses a purely predictive analysis and begins at step 405. At step 410, past statistics are recorded to build profiles for the first and second users. The profiles may be in the form of variables and/or using the aforementioned bin types. The server 120 continues to step 415 wherein presently, there is an inbound call to the first number as currently assigned to the second electronic device 125 but previously assigned to the first electronic device 105.

The method 400 continues to step 420 wherein a comparison of the inbound call is made to the predetermined profile statistics of the users. In some embodiments, a comparison may be made amongst more than two user profiles which have all shared the same common phone number and only the two most likely profiles are matched against the incoming caller or inbound call. The server 120 continues to step 425 to determine the probability the call is intended for the first user and proceeds to step 430 when there is a high probability the call is intended for the first user. Thereby at step 430, the present first electronic device is connected to the incoming caller. In alternative embodiments, step 425 may determine the probability the call is intended for the second electronic device (using a profile of a second user) and compare the probability for the second user against the probability the call is for the first electronic device and first user profile.

The server 120 then continues to update the profile of the present first electronic device and optionally may bypass future calls directly to the present first electronic device at step 435. The method 400 then ends at step 450.

However, if at step 425, the server 120 determines there is a low probability that the call is intended for the first user, the caller is connected to the second electronic device 125. Similarly, the profile of the second electronic device and/or second user is updated with relevant call statistics at step 445 and the method 400 ends at step 450.

Figure 5:
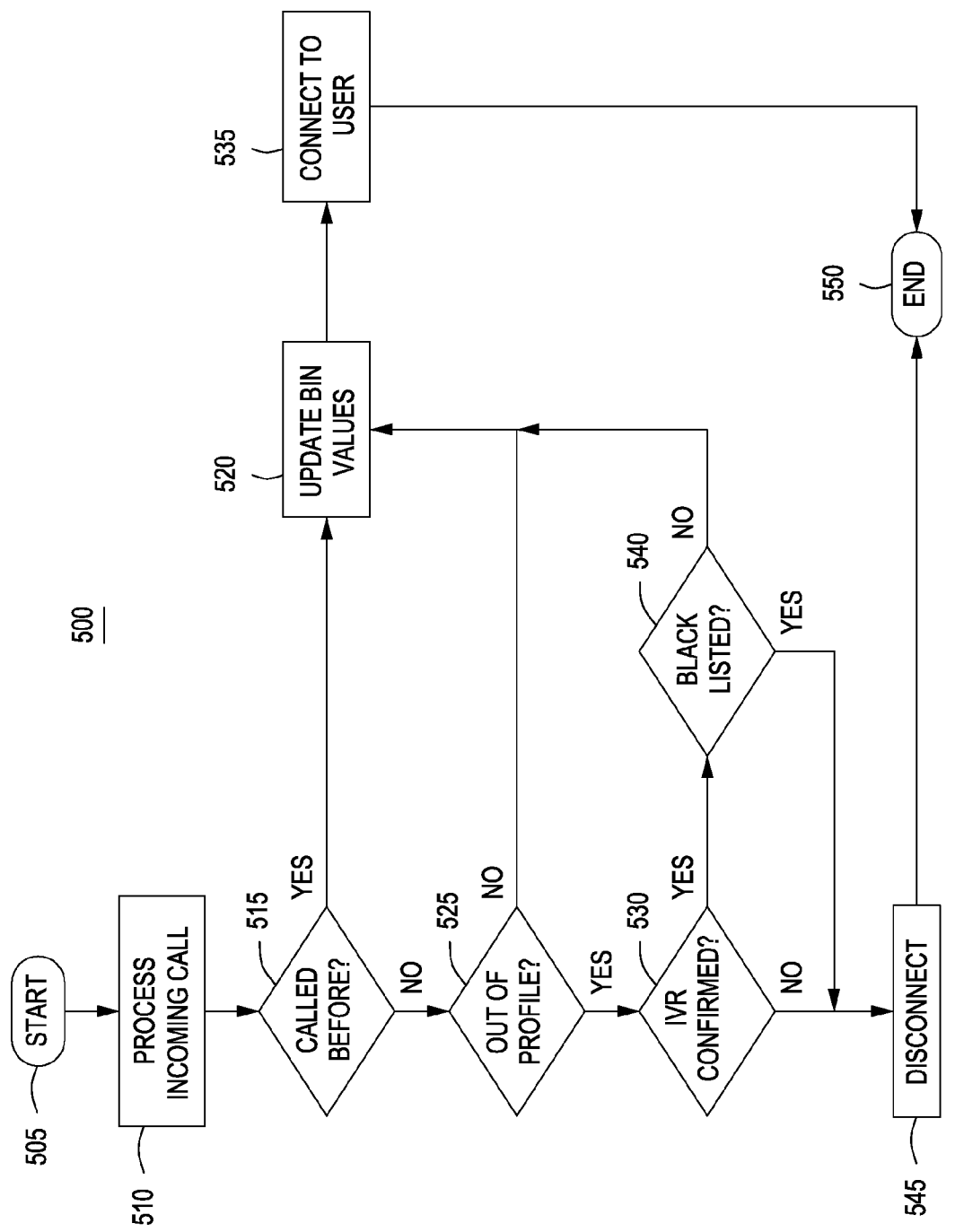
FIG. 5 is an exemplary flow diagram for a method of redirecting out of pattern calls in accordance to one or more embodiments of the present invention.

FIG. 5 is an exemplary flow diagram for a method 500 of redirecting out of pattern calls in accordance to one or more embodiments of the present invention. Algorithms applied may be used defensively against unwanted telemarketers. The method 500 may be implemented by the server 120 beginning at step 505 and continuing to step 510 wherein a user device receives an inbound call across the network 107. The server 120 determines whether the caller has been called by the user or has ever called the user before at step 515. If the server 120 determines the caller has been called before, the method continues to step 520 and updates the profile and bin values of the user. The server 120 then connects the caller to the user at step 535 and the method 500 ends at step 550.

However, if at step 515 the server 120 determines the caller is new, the server 120 continues to match the caller against known statistics of the user profile at step 525. Should the method 500 determine the call matches predetermined statistics of the user profile (e.g. common region, business interest, many phone calls during the afternoon etc.) the method 500 moves onto step 520 to ultimately connect the caller to the user. However, profile histories may indicate a user profile almost never has inbound or outbound calls from a region or may include black listed numbers. Such an indicator is an "out of pattern" condition to determine an inbound call may be a misdial or undesirable telemarketer. Once such a condition is determined, the call may be redirected to an IVR at step 530 requiring a response or matched against a blacklist or whitelist before connecting the call to the user. If the caller is confirmed by the IVR (e.g. voice prompt screens out robotic auto-dialers) at step 530, the method continues to step 540 to determine whether the caller is black listed. If black listed, the call is disconnected at step 545 and the method 500 ends at step 550. However, if not blacklisted, the method continues to update the profile of the user at step 520 and connect the call at step 535. Thus, even human telemarketers that do not use auto-dialers may pass the IVR presence test will be screened out if the number is blacklisted.

FIGS. 1-5 describe embodiments of the invention with respect to a telephone or VoIP call. However, additional embodiments may include communication identifiers besides that of a phone number such as an email login, social networking platform identifier (e.g., a FACEBOOK username, a FOURSQUARE username, IP address, TWITTER hashtag or login, and the like). Such identifiers may be transferred between people such that a previously held identifier is no longer associated with a previous owner. Monitored data would include the processing of data transferred on the particular communication service. FACEBOOK is a registered trademark of Facebook, Inc.; FOURSQUARE is a registered trademark of Foursquare Labs, Inc. and TWITTER and TWEET are trademarks of Twitter, Inc.

For an e-mail example, a first employee may leave a company and the former email address of the first employee may be reassigned to a second employee. The second employee then may receive emails intended for the first employee. In such an embodiment, a communication service (e.g. email service, POP3, SMTP, and the like) uses the aforementioned embodiments and profiles to predict intended recipients and route according communications. The predominant statistical indicator in such an example may be past email history, however as mentioned above other statistics may be applied to build user profiles. As discussed above, each user would have a static internal identifier to associate with their current email address.

In a TWITTER example, a first entity may transfer a TWITTER account to another entity with more followers. The first entity obtaining a different second account. In this example, a communication service (e.g. TWITTER) maintains a static user identifier (e.g. email address, phone number, and the like) associated with the first entity. The service then executes predictive routing based on the aforementioned profiles to insure postings (also known as TWEETS) and followers are correctly routed to the first entity or second entity. In some embodiments, the type of monitored data may be extended across multiple communication services. Thus, in the TWITTER example, a profile of an entity may be built based on emails sent or FACEBOOK messages posted in addition to past TWEETS. The addition of other communication services provides data streams to further predict whether to route the TWITTER communication to the first entity or second entity.

FIG. 6 depicts a computer system 600 that can be utilized in various embodiments of the present invention to implement the computer and/or the display, according to one or more embodiments.

Various embodiments of method, apparatus, and system for building user profiles and routing communications based on profiles, as described herein, may be executed on one or more computer systems, which may interact with various other devices. One such computer system is computer system 600 illustrated by FIG. 6, which may in various embodiments implement any of the elements or functionality illustrated in FIGS. 1-5 (e.g. smartphones, servers, and the like). In various embodiments, computer system 600 may be configured to implement methods described above. The computer system 600 may be used to implement any other system, device, element, functionality or method of the above-described embodiments. In the illustrated embodiments, computer system 600 may be configured to implement methods 200-500 as processor-executable executable program instructions 622 (e.g., program instructions executable by processor(s) 610) in various embodiments.

In the illustrated embodiment, computer system 600 includes one or more processors 610*a*-610*n* coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive and route user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, laptops, tablets, cellular phones, smart phones, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 690 (e.g., network 107), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowcharts of FIG. 2-5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for routing communications comprising:
   building a first user profile for a first user based on a history of communications associated with a first communication identifier, wherein the first communication identifier is associated with the first user, wherein building the first user profile further comprises organizing statistics of past communications into a series of weighted category bins;
   receiving an inbound communication directed towards the first communication identifier after the first communication identifier has been assigned to a second user and a second communication identifier has been assigned to the first user; and
   routing the inbound communication based on an analysis of the first user profile, wherein a value of the weighted bins is used to determine a probability that the inbound communication is intended for the first user.

2. The method of claim 1, wherein first communication identifier and second communication identifier is one of a phone number, an internet protocol (IP) address, an email address, or a social media account identifier.

3. The method of claim 1, wherein the inbound communication is routed to the second user when the determined probability indicates the inbound communication is not intended for the first user.

4. The method of claim 1, wherein the history of communications includes inbound and outbound communication statistics including at least one of call numbers, communication dates, communication times, caller IDs, call origins, IP addresses, communication duration, or business name.

5. The method of claim 1, further comprising directing the inbound communication to an interactive voice response (IVR) to confirm the intended communication recipient.

6. The method of claim 1, wherein a first static user ID is associated with the first user and a second static user ID with the second user.

7. The method of claim 1, wherein the first communication identifier is assigned to the second user, and wherein inbound communication directed towards the first communication identifier is routed to a device associated with the first user based on an analysis of the first user profile of the first user.

8. The method of claim 1, wherein routing the inbound communication is further based on an analysis of a user profile of the second user.

9. A method for routing communications comprising:
   receiving a first inbound communication directed towards a first communication identifier assigned to a first user having a first user profile;
   routing the first inbound communication towards a device associated with the first user based on an analysis of the first user profile;
   receiving an indicator that the first communication identifier has been assigned to a second user having a second user profile;
   receiving a second inbound communication directed towards the first communication identifier; and
   routing the second inbound communication to the first user based on an analysis of the first user profile, wherein the analysis comprises determining a probability that the second inbound communication is intended for the first user based on a history of communications associated with the first communication identifier.

10. The method of claim 9, wherein the first user profile includes a history of communications associated with the first user, and wherein the history of communications includes inbound and outbound communication statistics including at least one of call numbers, communication dates, communication times, caller IDs, call origins, IP addresses, communication duration, or business name.

11. The method of claim 9, wherein routing the second inbound communication to the first is further based on an analysis of the second user profile.

12. A system for routing communications comprising:
   a) at least one processor;
   b) at least one input device; and
   c) at least one storage device storing processor-executable instructions which, when executed by the at least one processor, performs a method including:
      (1) building a first user profile for a first user based on a history of communications associated with a first communication identifier, wherein the first communication identifier is associated with the first user, and wherein building the first user profile includes organizing statistics of previous communications into a series of weighted category bins;
      (2) receiving an inbound communication directed towards the first communication identifier after the first communication identifier has been assigned to a second user and a second communication identifier has been assigned to the first user; and
      (3) routing the inbound communication based on an analysis of the first user profile of the first user, wherein a value of the weighted bins is used to determine a probability that the inbound communication is intended for the first user.

13. The system of claim 12, wherein first communication identifier and second communication identifier is one of a phone number, an internet protocol (IP) address, an email address, or a social media account identifier.

14. The system of claim 12, wherein the second inbound communication is routed to the second user when the determined probability indicates the second inbound communication is not intended for the first user.

15. The system of claim 12, wherein the history of communications includes inbound and outbound communication statistics comprising at least one of: call numbers, communication dates, communication times, caller IDs, call origins, IP addresses, communication duration, or business name.

16. The system of claim 12, further comprising directing the inbound communication to an interactive voice response (IVR) to confirm the intended communication recipient.

* * * * *